W. H. WEASER.
EYEGLASSES.
APPLICATION FILED APR. 1, 1908.
934,113. Patented Sept. 14, 1909.
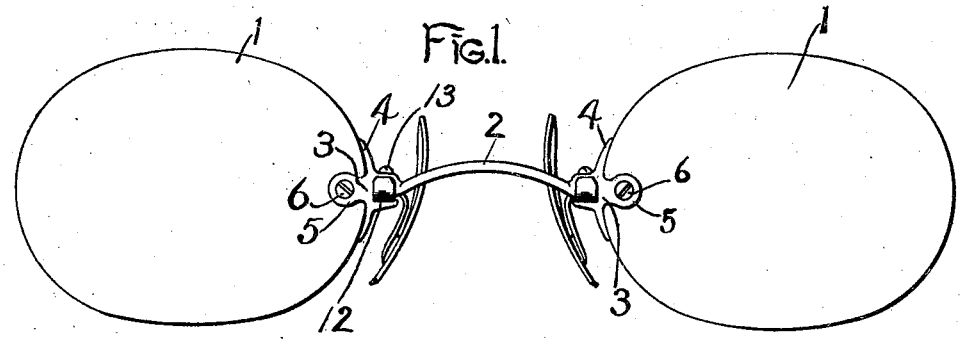
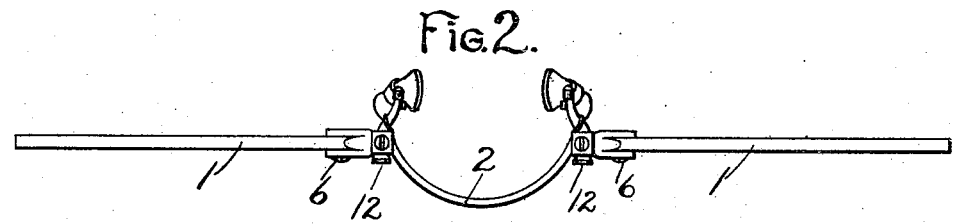
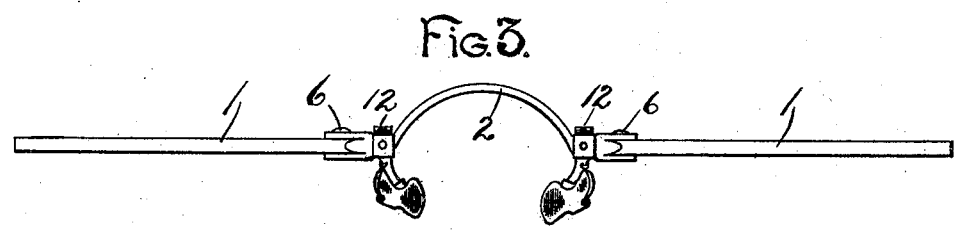
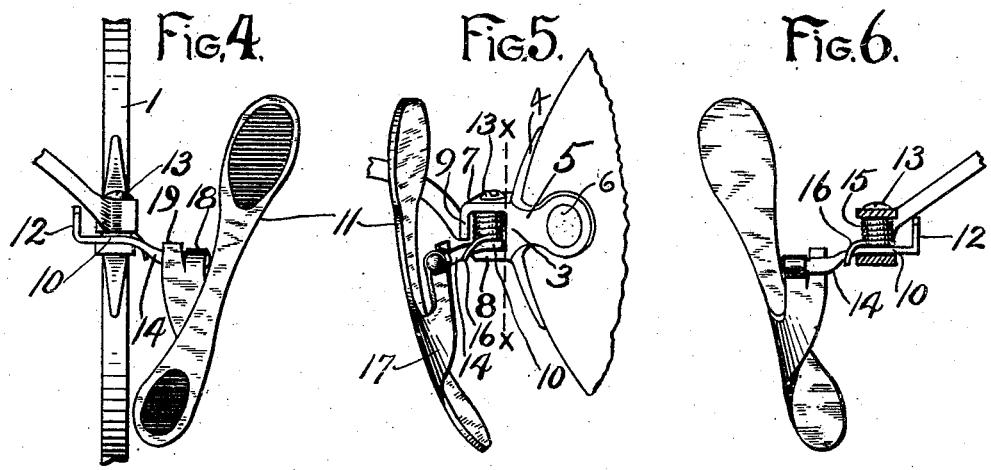
Witnesses
W. H. Jones
Charles M. Wilcox
Inventor
William H. Weaser
by Thos. J. Whitney
Attorney

UNITED STATES PATENT OFFICE.

WILLIAM H. WEASER, OF PITTSFIELD, MASSACHUSETTS.

EYEGLASSES.

934,113.

Specification of Letters Patent. Patented Sept. 14, 1909.

Application filed April 1, 1908. Serial No. 424,562.

*To all whom it may concern:*

Be it known that I, WILLIAM H. WEASER, a citizen of the United States, residing at Pittsfield, in the county of Berkshire and State of Massachusetts, have invented certain new and useful Improvements in Eyeglasses, of which the following is a specification.

This invention relates to improvements in eyeglass mountings, and more particularly to that class distinguished by the use of a relatively rigid bridge between the lenses and the provision of separate means, independently of the bridge, for the clamping power.

A principal object of the invention is to provide a modified form of rocking guard possessing improved properties for self-adjustment on the nose of the wearer, and simplified means in connection with the guard for operating the same.

With these and other objects in view the invention consists in certain features of construction, arrangement and combination of parts, as hereinafter described and claimed, reference being had to the drawings, forming a part of this specification, in which corresponding parts are designated by similar reference characters in each of the views, and in which—

Figure 1 represents a front elevation of a pair of eyeglasses constructed in accordance with my invention; Fig. 2, a top plan view of the same, and Fig. 3, a bottom plan view;
Fig. 4 is a detail vertical sectional view taken centrally of the bridge, showing the face of the guard as mounted on the operating arm and the relative positions of these parts with reference to the lenses; Fig. 5 is a detail perspective rear view with the bridge and lens shown in section, presenting an edge view of the guard and indicating the manner of mounting the same on the operating arm; and Fig. 6 is a sectional view on the line *x—x* of Fig. 5, presenting the back of the guard as engaged with the mounting.

In eyeglasses embodying the preferred construction of my device, the lenses 1 are connected by a relatively rigid arched bridge, 2, having its ends secured to the oppositely disposed studs or clamps 3 supported on the lenses. Said studs are provided with the usual extended edge-bearing lugs 4 and apertured ears 5, projected over opposite faces of the lenses and connected by the engaging transverse screw or pin 6, while exteriorly attached to the stud at points somewhat above and below, respectively, the crowned center thereof are horizontally-extending spaced flanges, 7 and 8, disposed in parallel, the outer end of the upper flange, 7, being deflected downward at an angle to a point intermediate the planes of the flanges, thus presenting a vertical edge, 9, for the attachment and support of the bridge ends. Although said edge is preferably formed out of the flange 7, as described, a suitable substitute therefor may be otherwise provided, namely as an integral part of the bridge end.
The flanges 7 and 8, together with the bridge-supporting edge 9, thus provide a partially inclosed protective box on the stud for the reception of a coil spring and other coöperative means for actuating the guard.

Supported upon the upper face of the flange 8 and extending transversely of the plane of the lenses is an operating arm, 10, constructed preferably of a flat piece of metal, adapted to support on its rear end a guard, 11, and having a forwardly extending finger-piece, 12, for the manipulation of the guard. The arm 10 is pivotally secured to the flange 8 by means of a screw or pin, 13, passed through an aperture provided in the body-portion of the arm and adapted to engage with threaded apertures provided centrally in the flanges, 7 and 8. Said finger-piece, 12, is preferably formed out of the free end of the arm 10 which is projected forwardly of the plane of the lenses and turned upward at a point slightly beyond the adjacent edge of the flange 8 with its edges in a plane parallel to the plane of the lenses so as to form an upright protective facing for the box but sufficiently spaced thereto. The guards 11 are actuated toward each other by means of a helical or coil spring, 15, disposed circumjacently of the pivotal screw 13 within the box on the stud and bearing frictionally upon the arm 10, the lower end of the coil being drawn out of the box and deflected downward to bear slidably against the rear end, 14, of the arm 10. Said rear end 14 of the arm 10 is preferably bent slightly inward toward the wearer's nose, thus bringing the guards nearer to each other, and twisted to a quarter turn so that its edges lie in a vertical plane.

The guards 11 are constructed preferably of resilient sheet-metal and comprise elliptical strips having enlarged ends with serrated faces for bearing-pads connected by an elongated pliable neck, and lateral arms or hangers, 17, integrally formed on the exterior edge of the strip at the base of the neck or somewhat below the center thereof. The hangers 17 are bent back adjacent the rear of the guard, assuming an upwardly deflected course, and are cleft vertically at the top into two sections, 18 and 19, the inner section, 18, being curled around the end of the operating arm 10, thus forming a pivotal or rocking connection of the guard therewith, while the other of said sections remains in an upright position, bearing upon the interior side of the arm 10 whereby the guard is prevented from rotating on its axis and limited to a slight rocking movement. The rear end 14 of said arm is provided terminally with shoulders formed by slightly cutting away its edges and adapted to bear against the curled end of the inner section 18 of the hanger so as to prevent the guard from slipping forwardly on the mounting, while the tip or extremity of said end projecting beyond the hanger is burred or deflected to one side to prevent the guard from slipping off.

It may be observed that the body-portion of the arm 10 within the coil-box is set sufficiently away from the stud proper or that portion thereof nearest the lens to admit of a pivotal movement for the operation of the guards, the stud being adapted to interfere therewith only at its limits of movement. The opening provided in effect between the bridge-supporting edge 9 and the flange 8 allows the arm 10 to move freely between these parts and without interference.

From the drawings it will appear that the guards are adapted to lie normally in an oblique position edge-wise to the plane of the lenses and to move freely thereof. The elongated neck connective of the bearing pads is designed to improve the resiliency and insure a yielding pressure of the ends on the nose, while the combination thereof with the elastic hanger and the rocking movement of the guard on the operating arm provides means for automatic adjustment involving the equalization of pressure between the bearing pads.

By the upright position of the finger-piece, 12, provided on the forwardly extended end of the guard-actuating arm, a protective facing is supplied for the box which materially serves to protect the coil spring from dust and other foreign substance being lodged therein.

Having thus described my invention I claim as new and desire to secure by Letters Patent:—

1. An eyeglass mounting comprising a lens-clamp, a horizontally projecting flange or plate provided on the clamp and having a vertically disposed free edge, and a bridge attached to said free edge.

2. An eyeglass mounting comprising a lens-clamp, a horizontally extending flange or plate supported on the clamp and having a downwardly deflected edge disposed transversely of the plane of the lenses, and a bridge attached to said edge.

3. In an eyeglass mounting, the combination with a lens-clamp, a horizontally extending flange or plate provided on the clamp and having a vertically disposed member with a free edge, and a bridge secured to said member, of a separate horizontally extending flange or plate provided on the clamp and spaced relatively to the first-mentioned flange or plate and a guard-actuating arm pivotally secured to said flanges or plates and supporting a guard.

4. In an eyeglass mounting, the combination with a stiff or rigid bridge and a lens-clamp, of horizontally disposed spaced plates or flanges secured to the clamp and provided with a vertically disposed member with a free edge supporting the bridge, a guard-actuating arm projected between the plates transversely of the plane of the lenses and pivotally secured to the plates by a fulcrum-pin passed through coinciding apertures provided in the plates and the body-portion of the arm, and spring means engaging said pin for actuating said arm.

5. In an eyeglass mounting, the combination with a lens-clamp, of a box provided on the clamp and having a vertically disposed member thereon having a free edge, a stiff or rigid bridge secured to said member of the box, a guard-actuating arm projected through the box transversely of the plane of the lenses and pivotally secured thereto, a coil spring within the box for actuating said arm, and a guard pivotally mounted upon said arm.

6. In an eyeglass mounting, the combination of a lens-clamp, an open-face box secured to the clamp, a guard-actuating arm having a flat portion pivotally mounted in the box and projected therethrough and having a forward extension provided with an upright finger-piece of sufficient width to cover the face of the box, and spring means within the box for actuating said arm.

7. A guard for eyeglass mountings comprising a pad provided with bearing ends and a relatively narrow yielding body-portion, and a resilient offset arm provided at or near the lower end of the body-portion on the rear edge thereof and projected forwardly adjacent the back of the pad.

8. In eyeglass mountings, the combination with a guard support of a guard comprising a bearing pad, an offset arm secured at one end to the rear edge of the pad and curved forwardly adjacent the back of the pad, and a sectional extension or tongue provided on the free end of the arm and curled around the said guard support for pivotal engagement therewith.

9. In an eyeglass mounting, the combination with a guard support of a guard comprising a bearing pad, a resilient offset arm or hanger secured at one end to the rear edge of the pad and projected forwardly back of the pad, a member provided on the free end of the arm pivotally engaging the guard support, and separate means for limiting the pivotal movements of the guard on the said support.

10. In eyeglass mountings, the combination with a guard support of a guard comprising a bearing pad, an offset arm or hanger secured at one end to the rear edge of the pad and curved forwardly adjacent the back of the pad, a sectional extension or tongue provided on the free end of the arm and pivotally engaged with said support, and a separate sectional extension or tongue provided on the free end of the arm and adapted to bear yieldingly against said support for limiting the pivotal movements of the guard.

In testimony whereof I hereto affix my signature in presence of two witnesses.

WILLIAM H. WEASER.

Witnesses:
CHARLES M. WILCOX,
EBENEZER WILLIAMS.